United States Patent [19]
Bernard et al.

[11] Patent Number: 5,911,012
[45] Date of Patent: Jun. 8, 1999

[54] METHOD FOR THE TEMPORAL FILTERING OF THE NOISE IN AN IMAGE OF A SEQUENCE OF DIGITAL IMAGES, AND DEVICE FOR CARRYING OUT THE METHOD

[75] Inventors: Franck Bernard, Paris; Raoul Florent, Valenton, both of France

[73] Assignee: U.S. Philips Corporation, New York, N.Y.

[21] Appl. No.: 08/674,061

[22] Filed: Jul. 1, 1996

[30] Foreign Application Priority Data

Jun. 30, 1995 [FR] France .................................. 95 07889

[51] Int. Cl.$^6$ ....................................................... G06K 9/40
[52] U.S. Cl. .......................... 382/260; 382/265; 382/275; 382/132
[58] Field of Search .................................... 382/128, 132, 382/254, 260, 265, 275; 378/98.2, 156

[56] References Cited

U.S. PATENT DOCUMENTS

| | | | |
|---|---|---|---|
| 5,278,887 | 1/1994 | Chiu et al. ................................ | 378/156 |
| 5,347,590 | 9/1994 | Nonnweiler et al. .................... | 382/260 |
| 5,467,380 | 11/1995 | De Jonge et al. ...................... | 378/98.2 |
| 5,600,731 | 2/1997 | Sezan et al. ............................. | 382/107 |
| 5,689,591 | 11/1997 | Balram et al. .......................... | 382/260 |
| 5,715,335 | 2/1998 | De Haan et al. ....................... | 382/265 |

OTHER PUBLICATIONS

"A New Approach to Linear Filtering and Prediction Problems", by R.E. Kalman, Transactions of the ASME, Journal of Basic Engineering, Series 82D, pp. 35–45, 1960.

*Primary Examiner*—Thomas D. Lee
*Attorney, Agent, or Firm*—Dwight H. Renfrew, Jr.

[57] ABSTRACT

A method for the temporal filtering of a sequence of digitized noisy images includes the evaluation of an anti-causal filtered sample ($P_t^A$) in order to reconstruct a present noisy sample ($I_t^P$) of a given pixel in a present image by an anti-causal linear combination of a causal filtered sample ($P_t^C$) obtained by preliminary causal linear temporal filtering in association with coefficients ($b_j^C$) and an anti-causal noisy sample ($I_{t+1}^A$). To the samples ($P_t^C$, $I_{t+1}^A$) there are assigned weights calculated as functions of a causal gain factor ($K_t^C$), equal to the inverse of the sum of the coefficients of the causal linear filtering, and an anti-causal continuity coefficient ($\alpha_t^A$), the weight of the anti-causal sample ($I_{t+1}^A$) being equal to the probability of intensity continuity between the anti-causal sample ($I_{t+1}^A$) and a previous filtered sample ($P_t^C$, $P_{t-1}^C$) in the sequence. A device for carrying out the method is configured for calculating the anti-causal linear combination.

20 Claims, 7 Drawing Sheets

METHOD FOR THE TEMPORAL FILTERING OF THE NOISE IN AN IMAGE OF A SEQUENCE OF DIGITAL IMAGES, AND DEVICE FOR CARRYING OUT THE METHOD

FIELD OF THE INVENTION

The invention relates to a method for the temporal filtering of the noise in an image in a sequence of digital images, as well as to a device for carrying out this method.

The invention can be used notably for the processing of medical images formed in an X-ray fluoroscopy mode by means of a system in which the X-ray beam has a low intensity and produces a sequence of noisy, low-contrast images which must be filtered in order to remove the noise therefrom, without degrading the details.

Temporal filtering consists of the smoothing as a function of time of a monodimensional, so-called temporal signal formed by the intensity values of a pixel having a given location within the images of the sequence.

DESCRIPTION OF THE RELATED ART

A temporal filtering method is already known from the publication by R. E. KALMAN: "A new approach to linear filtering and prediction problems" in "Transactions of the ASME", Journal of Basic Engineering, Series 82D, pp. 35–45, 1960.

Kalman filtering is defined by a recursive equation producing the filtered intensity of an instantaneous pixel of an image of the sequence as a function of hypotheses made a priori, as a function of the intensity of the pixel in the same location in the preceding image of the sequence, and as a function of a factor which is referred to as a Kalman gain.

This equation can produce two recursive algorithms. A problem exists in that as soon as a slight movement occurs between two images, this movement causes an ascending or descending edge, referred to as an intensity discontinuity, which appears on the curve of said temporal signal to be smoothed.

In the first algorithm the Kalman gain is chosen to be completely constant: this results in exponential streaking which affects said intensity discontinuity edge caused by movement. Thus, a small object in the noisy original image, for example a catheter which could be quickly moved, thus giving rise to a step in the intensity signal, could have disappeared from the filtered image because the flanks of the step are deformed by filtering. This algorithm erases the small objects.

In the second algorithm the Kalman gain is a function of the difference between the noisy intensity observed for a pixel having a given location at a given instant. As a result, the temporal signal is smoothed before the discontinuity; however, it is no longer filtered behind the discontinuity, so that residual noise exists behind intensity discontinuity edge.

The known temporal filtering method, therefore, has the drawback that it cannot be effectively applied to a series of very noisy images representing animated small objects.

Thus, the known temporal filtering method does not solve some major problems encountered when the temporal filtering method is applied to a sequence of images acquired in the X-ray fluoroscopy mode as performed, for example for real-time following of a medical operation during which a tool of extremely small diameter, such as a catheter, is introduced into or displaced through the zone being observed.

SUMMARY OF THE INVENTION

A problem consists in that, due to the very low intensity of the fluoroscopic X-ray beam, the images of the sequence are extremely noisy and frequently contain noise peaks.

It is a further problem that due to the fact that each image of the sequence is separated from the next image by a small time gap, an important event such as the displacement of a small tool such as a catheter may take place from one image to another. The filtering of the image in which the movement of said small object appears may not distort or erase the object.

It is an object of the present invention to provide a temporal filtering method for the reduction of the noise in the successive images of a sequence of digital images, which method is carried out substantially in real time, i.e. with a very small delay which is not perceptible to an operator observing the sequence of images, taking into account the rate at which the images of the sequence are formed, reduces the residual noise behind a discontinuity edge of the temporal intensity signal, without attenuating the discontinuity edge;

is capable of distinguishing the noise peaks from the temporal signal variations which are due to real movements, and reduces the noise peaks;

does not erase or distort the moving small objects.

These objects are achieved by means of a method for the temporal filtering of the noise in an image which is referred to as the present image and forms part of a sequence of images in the form of a two-dimensional matrix of pixels which have digitized noisy intensity values which are referred to as samples, which method comprises the evaluation of a filtered sample, referred to as a present anti-causal sample, in order to reconstruct a noisy sample corresponding to a pixel in a given location (x,y) in the present image by a linear combination, referred to as an anti-causal combination, of a present filtered sample, referred to as a present filtered causal sample, obtained by preliminary temporal filtering, referred to as causal and associated with coefficients, and of at least one noisy sample which is later than said present noisy sample and is referred to as an anti-causal noisy sample, said samples being weighted by weights calculated respectively as a function of a so-called causal gain factor, evaluated as the inverse of the sum of the coefficients associated with the causal filtering, and of a so-called anti-causal continuity coefficient, associated with the anti-causal sample evaluated as a probability of intensity continuity between said anti-causal sample and a preceding filtered sample in the sequence.

A device for carrying out the above method comprises:

an image processing system for supplying a noisy digitized intensity, referred to as a noisy present sample, of a pixel having a given location (x,y) in an image in the form of a matrix of pixels arriving at said present instant (t), and the noisy intensity of the pixel which is later than the present pixel, referred to as an anti-causal sample, of the same location (x,y) in the matrix of the later image, a first sub-assembly which is referred to as a causal sub-assembly, whose input receives the present noisy sample, and comprises linear filtering means with weights for evaluation and for delivering on one output a first filtered value, referred to as a filtered causal sample, of the present sample, a filtered sample of the preceding instant on another output, and a causal gain factor equal to the inverse of the weights of said linear filtering on another output, and a second sub-assembly, referred to as an anti-causal sub-assembly, an input of which receives the filtered causal sample of the preceding instant, a further input of which receives the present filtered causal sample, and another input of which receives the noisy anti-causal sample, and comprises calculation means for evaluating the anti-causal integration relation with the causal gain factor and for delivering on its output a second value which is referred to as a filtered anti-causal sample and constitutes the filtered sample for the reconstruction of the noisy present sample.

This device offers the advantage that it can be readily put into operation and that it provides effective, substantially real-time temporal filtering of the noise without deteriorating the details of the image.

BRIEF DESCRIPTION OF THE DRAWINGS

The invention will be described in detail hereinafter with reference to the accompanying diagrammatic drawings; therein.

DESCRIPTION OF PREFERRED EMBODIMENTS

I/X-ray device

Figure 1:
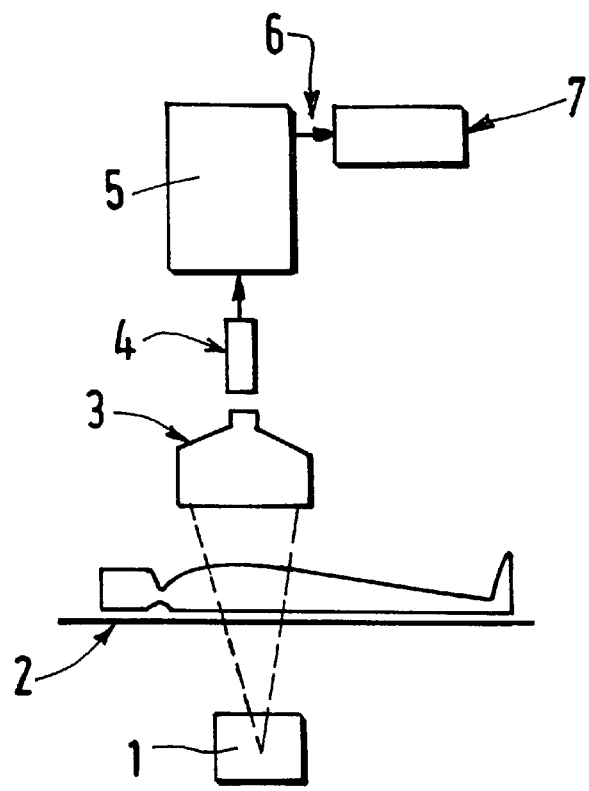
FIG. 1 shows an X-ray imaging device.

FIG. 1 shows a digital radiography system, comprising an X-ray source, a mobile table 2 for a patient, and an image intensifier device 3 which is coupled to a video tube 4 which applies data to a digital image processing system 5 which comprises a microprocessor. The latter comprises a plurality of outputs, an output 6 of which is coupled to a monitor 7 for the display of the sequence of radiographic images or intensity images.

The digital radiographic image can comprise 512×512 or 1024×1024 pixels which are encoded on 8 bits or 10 bits. Each pixel can thus have one of 256 or 1024 intensity levels. For example, the dark regions have a low intensity level and the bright regions of the image have a high intensity level.

The digital image can be acquired in the fluoroscopy mode. The invention can be used notably for the filtering of angiographic images.

In any case, the invention takes into account neither the method used to acquire the sequence of digital images nor the nature of the objects represented therein, but concerns exclusively the filtering of these images in this sequence in order to eliminate the noise.

II/Temporal noise filtering method

The present invention proposes a method for the temporal filtering of the noise successively in each image of a sequence of noisy digital images. The method executes the filtering operation from the first to the last noisy image observed. Therefore, this method is carried out substantially in real time.

The method is capable of detecting the movement of objects recorded in the images of the sequence. It is based partly on adaptive recursive filtering steps.

Figure 2:
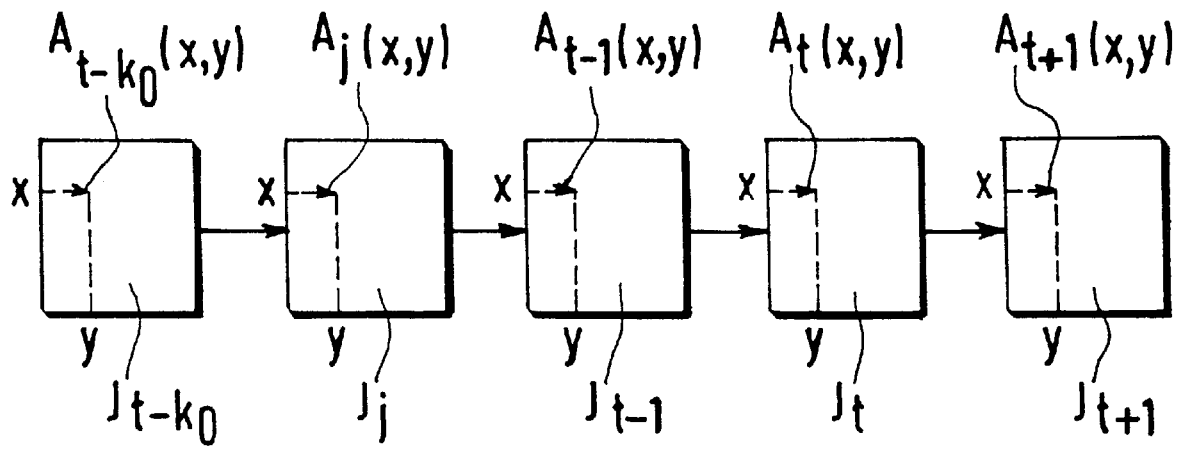
FIG. 2 shows a sequence of digital images.

Referring to FIG. 2, the method for the temporal filtering of the noise comprises first of all the acquisition and digitization of a sequence of noisy images formed at a given rate.

From the instant which is most remote in time until the most recent instant this sequence is composed of:

a number of past intensity images, denoted by $J_j^C$ and referred to as "causal images", formed after the first instant $j=t-k_o$, where $k_o$ is an integer equal to the number of images of the sequence minus two, until the instant $j=t-1$, where t is the instant of arrival of the image being filtered;

an image $J_t^P$ being filtered, referred to as the present image, which arrives at the instant j=t, and a supplementary image $J_{t+1}^A$, referred to as anti-causal or future image, which arrives at a later instant j=t+1.

The present image $J_t^P$ is in reality filtered just after said later instant t+1, i.e. with a small delay relative to the instant of its arrival.

Each noisy digital image $J_j$ consists of a two-dimensional matrix $A_j(x, y)$ of pixels, each of which is characterized by its coordinates x, y in the matrix and by an intensity level $I_j(x, y)$ of an intensity level scale, where j is the index corresponding to that of the image.

Figure 3A:
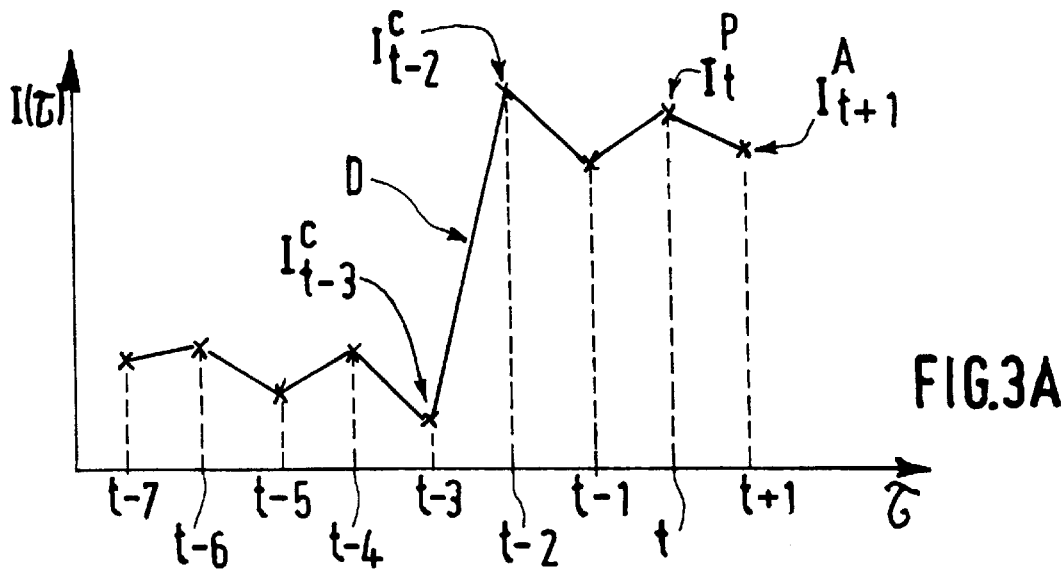
FIG. 3A shows a noisy temporal signal with an intensity discontinuity due to a movement.
Figure 3B:
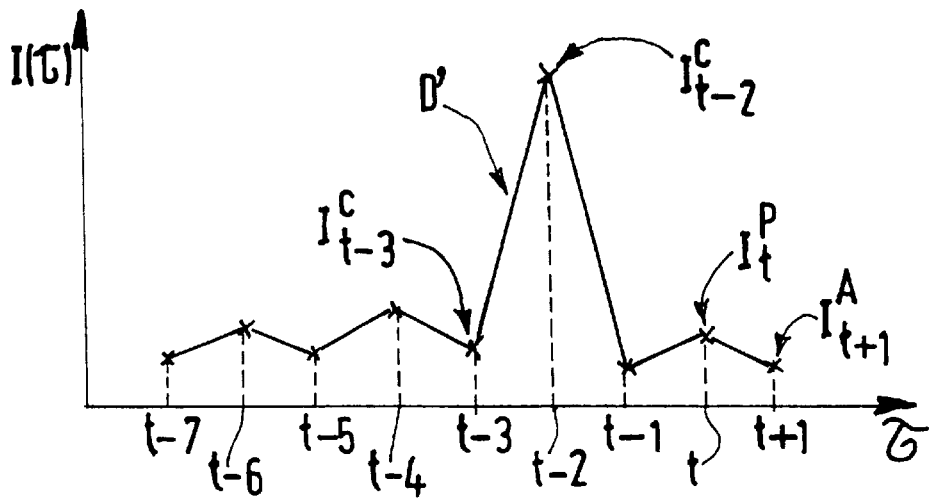
FIG. 3B shows another noisy temporal signal with a noise peak.
Figure 3C:
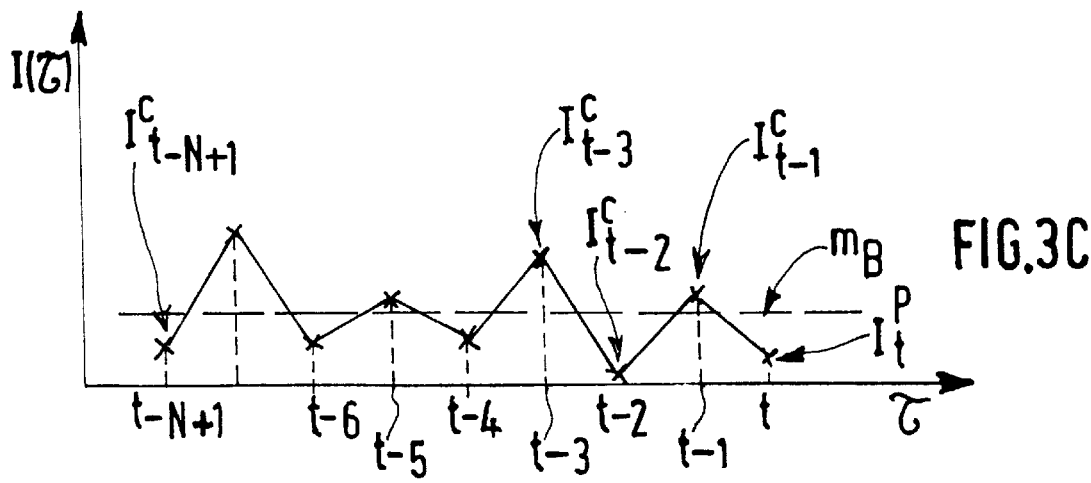
FIG. 3C illustrates the determination of the standard deviation of the noise.
Figure 4A:
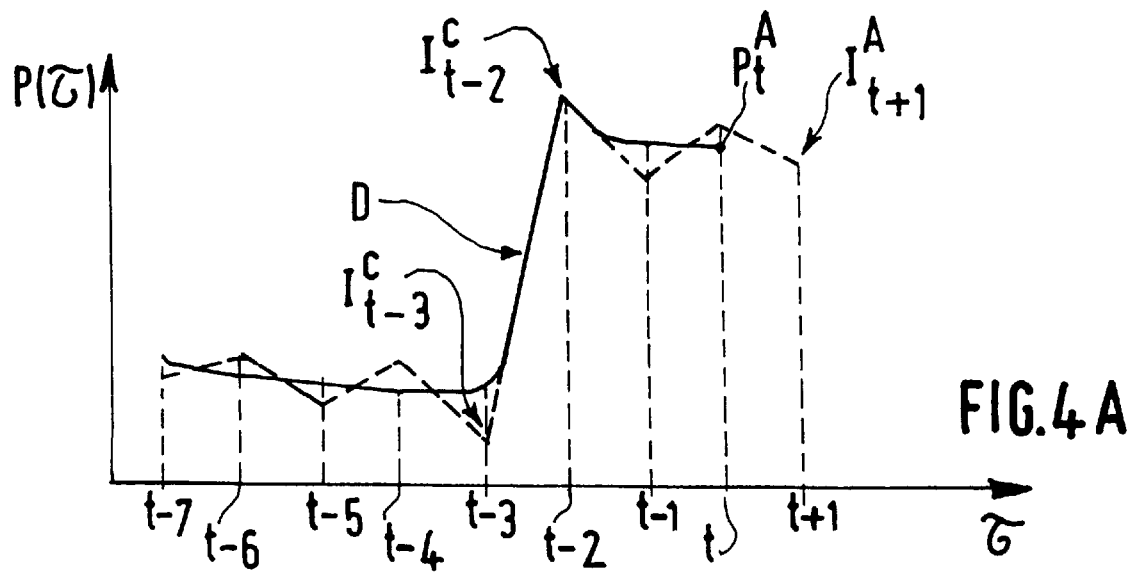
FIG. 4A shows the filtered temporal signal corresponding to the noisy temporal signal of FIG. 3A in a first embodiment of the invention.

A so-called noisy temporal signal is formed of the different intensity levels $I_j(x, y)$ of the pixels $A_j(x, y)$ as a function of the time τ as shown in the FIGS. 3A, 3B and 3C, in which $I_j(x, y)$ is plotted on the ordinate and τ on the abscissa. The temporal filtering method in accordance with the invention aims to filter or smooth the noise affecting said temporal signal I(τ) in order to obtain a filtered temporal signal P(τ) as shown in FIG. 4 or 5. Hereinafter, the intensities constituting the points of the temporal signal I(τ) will be referred to as "samples".

The method in accordance with the invention refers to the case where the principal movements occurring in the image sequence have already been compensated for by movement compensation methods known from the state of the art.

This method performs a filtering operation on the noise of the temporal signal I(τ) by treating the small residual or non-compensatable local movements of the objects in the image sequence.

This method performs a filtering operation on the noisy sample $I_t^P$ arriving at the present instant t, and produces a filtered sample $P_t^A$ by utilizing the noisy sample $I_t^P$ of the present instant t, the earlier samples, referred to as noisy causal samples $I_{t-k_0}^C, \ldots I_{t-3}^C, I_{t-2}^C, I_{t-1}^C$, observed at the past instants from $t-k_0$ to $t-1$, and the next sample referred to as the noisy anti-causal sample $I_{t+1}^A$ observed at the later instant t+1, referred to as future, which is the instant after which the processing of $I_t^P$ actually takes place.

The temporal filtering is preferably performed individually for each pixel $A_j(x, y)$ at the different coordinates x, y of the two-dimensional matrix.

FIG. 3A shows a noisy temporal signal I(τ) which comprises, by way of example, an intensity discontinuity D between the sample $I_{t-3}^C$ and the sample $I_{t-2}^C$, said discontinuity being due to a small local movement. This small local movement translates as ascending edge of the temporal signal I(τ) between the instant t−3 and the instant t−2, a high signal "plateau" between the instants t−2 and t+1, and a "depression" at the instants preceding the instant t−3.

This temporal signal also exhibits small sawteeth between the instants t−7 and t−3 because, due to the noise, the intensity level of a pixel having the same coordinates (x, y) in the images of the sequence varies continuously, thus causing a snowfall aspect. The filtering enables this aspect to be suppressed by smoothing the temporal signal I(τ) to a constant mean value in relation to a given pixel.

Figure 4C:
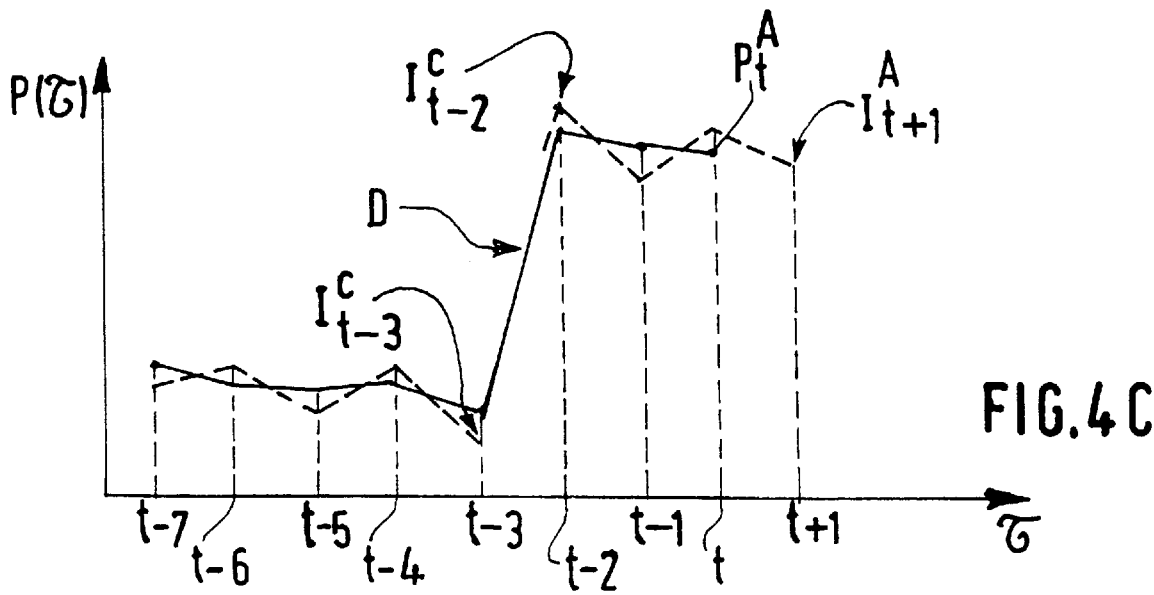
FIG. 4C shows the temporal signal of FIG. 3A filtered in a further version of said first embodiment.
Figure 5A:
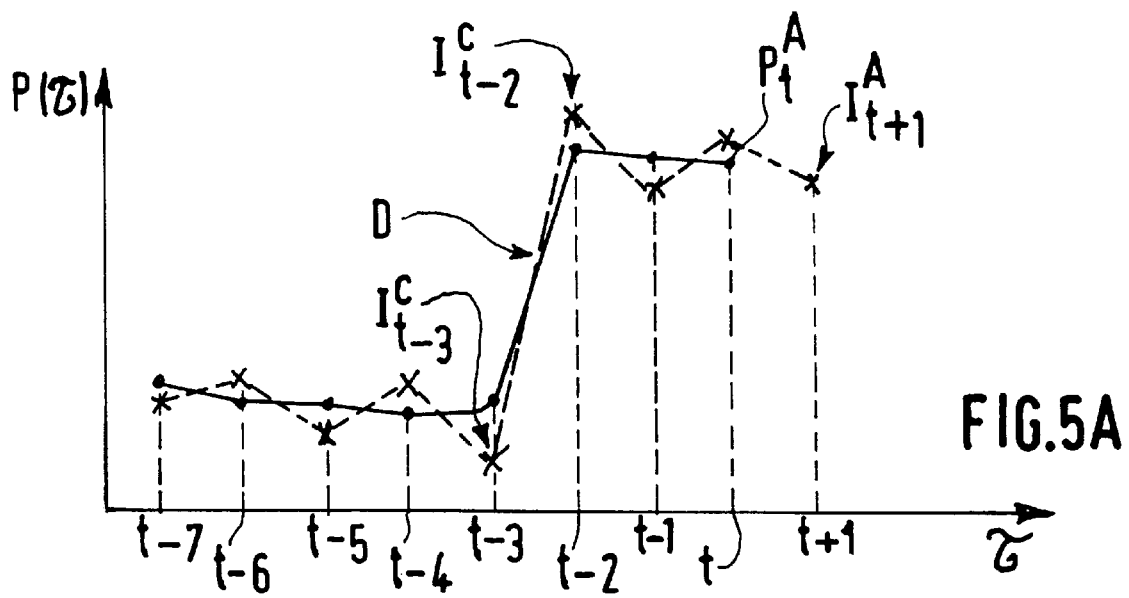
FIG. 5A shows the filtered temporal signal corresponding to the noisy temporal signal of FIG. 3A in a second embodiment of the invention.

The temporal filtering in accordance with the invention can adapt itself to an intensity discontinuity such as D. Thus, FIGS. 4A, 4C and 5A show the temporal signal P(τ) smoothed by various versions of the method in accordance with the invention.

FIG. 3B shows a noisy temporal signal I(τ) having, by way of example, a noise peak D' which appears between the instants t−3 and t−1, that is to say at the instant t−2. Such a noise peak D' is distinct from an intensity discontinuity such as D of FIG. 3A in that it does not correspond to a real spatial movement phenomenon. Such a noise peak can be filtered by means of the method proposed by the invention.

The filtered sample $P_t^A$, corresponding to the present noisy sample $I_t^P$, is expressed as:

$$P_t^A = \frac{\sum_{j=t-k_o}^{j=t-1} b_j^C \times I_j^C + I_t^P + b_{t+1}^A \times I_{t+1}^A}{\sum_{j=t-k_o}^{j=t-1} b_j^C + 1 + b_{t+1}^A} \quad (1)$$

The filtered sample $P_t^A$, or temporal signal filtered at the instant t, is a linear combination of noisy samples observed at the causal instants from $j=t-k_0$ until $j=t-1$, of the noisy sample observed at the present instant t, and the noisy sample observed at the anti-causal or future instant t+1.

In the formula (1) of the filtered signal $P_t^A$, a coefficient or weight $b_j^C$, and $b_{t+1}^A$ is applied to the causal samples $I_{t-1}^C, I_{t-2}^C$ etc. and anti-causal samples $I_{t+1}^A$, respectively, the weight attached to the present sample $I_t^P$ being fixed to the value 1.

The denominator of the formula (1) is a normalization factor whose presence is based on the fact that the sum of the weights applied to the various samples must be equal to 1 in order to ensure that the mean value of the filtered signal $P_t^A$ equals the mean value of the noisy signal $I_t^P$.

The temporal filtering method is based on a linear combination of causal and anti-causal samples with the present sample in which the weights $b_j^C$ et $b_{t+1}^A$ attached to the causal and anti-causal samples have a specific form.

The weight attached to a given causal sample is a probability of intensity continuity between said given causal sample and the present sample.

Generally speaking, the formule of the causal weight $b_{t-k}^C$ to be applied to a causal sample $I_{t-k}^C$ is given by relation (2):

$$b_{t-k}^C = \prod_{j=t-k+1}^{j=t} \alpha_j^C, \text{ where } k > 1 \quad (2)$$

where $\alpha_j^C$ is the probability of intensity continuity between the successive causal samples after $I_{t-k}^C$ until $I_t^P$. According to the relation (2) a weight $b_{t-k}^C$ relating to a causal sample $I_{t-k}^C$ equals the product of all probabilities of intensity continuity $\alpha_j^C$ after the causal instant $j = t-k+1$ until the present instant t.

Thus, the determination of the weight attached to a given causal sample according to the formule (1) is based on the hypothesis that said given sample is retained and taken into account in the linear combination, be it exclusively in as far as it does not deviate too much from the present sample, which signifies that it relates to the same object.

According to this hypothesis, for example the formulation of the causal weight $b_{t-1}^C$, relating to the causal sample $I_{t-1}^C$, is realized by writing that $b_{t-1}^C$ is a function of the absolute value of the difference $|I_t^P - I_{t-1}^C|$, or, in other words, that $b_{t-1}^C$ is a function of the difference:

$$\Delta^C = |I_t^P - P_{t-1}^C| \quad (6^C),$$

where $P_{t-1}^C$ is the sample already filtered at the preceding instant t−1, so that presumably it is less noisy than $I_{t-1}^C$ as a result of filtering. If the difference between the samples $I_t^P$ and $P_{t-1}^C$ is small, a "high" value near 1 is assigned to the corresponding weight $b_{t-1}^C$. If this difference is large, a value close to zero is assigned to the weight $b_{t-1}^C$. In that case the sample $I_{t-1}^C$ is practically not taken into account.

Subsequently, in this example the formulation of the second causal weight $b_{t-2}^C$, relating to the causal sample $I_{t-2}^C$, is realized by writing that the weight $b_{t-2}^C$ is a function of not only the difference between the sample at the instant t and the sample at the instant t−1, but also a function of the difference between the sample at the instant t−1 and the sample at the instant t−2. Thus, the weight $b_{t-2}^C$ has a high value near 1 if exclusively samples are taken into account which have not been subjected to modifications, other than those due to the noise, with respect to the present sample $I_t^P$, i.e. if the condition is imposed that the differences between the samples taken into account must be small. This leads to the formulation of causal weights $b_j^C$ as products of functions of intensity differences appearing in the temporal signal, i.e. to the formulation of these weights as products of the probability of intensity continuity between the samples preceding the present sample to be filtered.

Thus, the formulation of the causal weight relating to the sample $I_{t-1}^C$ is:

$$b_{t-1}^C = \alpha_t^C \quad (2a)$$

where the function $\alpha_t^C$ is a probability of intensity continuity between the present sample $I_t^P$ and the filtered sample $P_{t-1}^C$. The intensity continuity between the sample at the instant t and the sample at the preceding instant t−1 translates as a high continuity probability $\alpha_t^C$. An intensity discontinuity between the samples translates as $\alpha_t^C$ close to 0.

The formulation of the causal weight relating to the sample $I_{t-2}^C$ is:

$$b_{t-2}^C = \alpha_t^C \times \alpha_{t-1}^C \quad (2b)$$

where $\alpha_{t-1}^C$ is the probability of intensity continuity between the sample at the instant t–1 and the sample at the instant t–2.

The intensity continuity of the samples between the instant t and the instant t–2 implies intensity continuity between the instants t and t–1 and intensity continuity between the instants t–1 and t–2, which translates as the product of the probabilities (2b) in which the probability of intensity continuity between the instants t and t–1 is high and the probability of intensity continuity between the instants t–1 and t–2 is also high.

The formulation of the causal weight relating to the sample $I_{t-3}^C$ is then:

$$b_{t-3}^C = \alpha_{t-2}^C \times \alpha_{t-1}^C \times \alpha_t^C \quad (2c) \text{ etc.}$$

Thus, in the example of FIG. 3A the probability of continuity $\alpha_{t-2}^C$ is very close to zero because of the intensity discontinuity D between the samples $I_{t-3}^C$ and $I_{t-2}^C$. The weight $b_{t-3}^C$ obtained by the product of the probabilities, including said probability $\alpha_{t-2}^C$, also tends towards zero. The weight $b_{t-4}^C$ also tends towards zero, because its formulation is a product which also contains said probability close to zero. As soon as a probability close to zero is present in the product of the probabilities supplying a weight $b_j^C$, the presence of this probability cancels this product and all products corresponding to the instants preceding the instant at which said probability close to zero appeared. As a result, the weights $b_j^C$ of the causal samples corresponding to said preceding instants are also close to zero. In the specific example of FIG. 3A the causal weights are:

$$b_{t-1}^C \cong 1;\ b_{t-2}^C \cong 1;\ b_{t-3}^C \cong 0;\ b_{t-4}^C \cong 0$$

The formulation of the anti-causal weight $b_{t+1}^A$, relating to the future sample, is a function of the absolute value of an intensity difference $\Delta^A$ and is given by:

$$b_{t+1}^A = \alpha_t^A \quad (2)$$

where $\alpha_t^A$ has a specific value which will be described in detail hereinafter.

As a result of the specific formulations (2) and (2') of the causal and anti-causal weights $b_j^C$ et $b_{t+1}^A$, respectively, the equation (1) whose calculation was very complex is transformed into two groups of three simple relations each, a first group performing a recursive filtering operation which is referred to as causal filtering whereas a second group performs a filtering operation which is referred to as anti-causal filtering.

The linear equation (1), in which the weights have the specific form (2) and (2'), leads to a formulation of a recursive equation ($3_C$) and a non-recursive equation ($3^A$) which are formulated as follows:

$$P_t^C = P_{t-1}^C + K_t^C \times (I_t^P - P_{t-1}^C)\ (3^C)\ P_t^A = P_t^C + K_t^A \times (I_{t+1}^A - P_t^C) \quad (3^A)$$

The first recursive equation ($3^C$), referred to as causal integration, takes into account the filtered sample $P_{t-1}^C$ at the instant t–1, modified by what is called hereinafter a causal innovation term which is formed by the difference between the filtered sample $P_{t-1}^C$ at the instant t–1 and the noisy sample $I_t^P$ observed at the present instant t. This innovation term is multiplied by a term which is called a causal gain term $K_t^C$ which varies between 0 and 1. This first causal equation ($3^C$) produces a filtered value $P_t^C$ which is referred to as a causal filtered value which will be modified and enhanced by the filtering due to the calculation of the second equation ($3^A$).

The second non-recursive equation ($3^A$), referred to as anti-causal, takes into account the causal filtered sample $P_t^C$ resulting from the first recursive causal equation ($3^C$), modified by an anti-causal innovation term which is now formed by the difference between the filtered sample $P_t^C$, resulting from the recursive equation ($3^C$), and the noisy sample $I_{t+1}^A$ observed at the future instant t+1. This anti-causal innovation term is multiplied by a term which is called the anti-causal gain term $K_t^A$ which also varies between 0 and 1.

The gains $K_t^C$ et $K_t^A$ are not Kalman gains, but completely different gain factors which are given by the following recursive and non-recursive equations ($4^C$) and ($4^A$) respectively:

$$K_t^C = \frac{K_{t-1}^C}{K_{t-1}^C + \alpha_t^C} \quad (4^C)$$

$$K_t^A = \frac{K_t^C}{K_t^C + 1/\alpha_t^A} \quad (4^A)$$

where $K_t^A = 0$ if $\alpha_t^A = 0$.

For the transition between the equations (1), (2) and (2') and the equations ($4^C$), ($5^C$) and ($4^A$), ($5^A$), it is to be noted that the causal gain ($K_t^C$) equals the inverse of the sum of the causal weights:

$$K_t^C = 1 \Big/ \sum_{j=t-ko}^{j=t-1} b_j^C$$

and that, as has already been stated, the causal coefficient of continuity probability $\alpha_t^C$ is the weight of the causal sample $I_{t-1}^C$ preceding the present sample $I_t^P$:

$$\alpha_t^C = b_{t-1}^C$$

The transition between the equations (1)+(2)+(2') and the equations ($3^C$)+($3^A$) is based on the first system of recursive causal equations:

$$P_t^C = P_{t-1}^C + K_t^C \times (I_t^P - P_{t-1}^C),$$

being the causal integration equation ($3^C$)

$$K_t^C = \frac{K_{t-1}^C}{K_{t-1}^C + \alpha_t^C},$$

being the causal gain factor ($4^C$) and $$\alpha_t^C = F^C\left(\frac{\Delta^C}{S_t^C}\right),$$

causal continuity coefficient ($5^C$), and on the second system of non-recursive anti-causal equations:

$$P_t^A = P_t^C + K_t^A \times (I_{t+1}^A - P_t^C),$$

being the anti-causal integration equation ($3^A$)

$$K_t^A = \frac{K_t^C}{K_t^C + 1/\alpha_t^A},$$

being the anti-causal gain factor ($4^A$), $$\alpha_t^A = F^A\left(\frac{\Delta^A}{S_t^C}\right),$$

being the anti-causal continuity coefficient ($5^A$) in which $\Delta^A$ represents the absolute value of an intensity difference between the future instant t+1 and a second instant to be considered, so either the present instant or a past instant, where $S_t^C$ is a normalization factor, and where $F^C$ and $F^A$ are functions to be defined hereinafter.

The iteration of the equation ($3^C$), commencing at $t-k_o$ in time, and the subsequent calculation of the equation ($3^A$) enable the equation (1) to be retrieved exactly as formulated above.

The formulation ($3^C$)+($3^A$) of the integration equations thus corresponds to this linear combination of samples, associated with specific weights which depend on the continuity of intensities between the samples.

Generally speaking, the evaluation of the present filtered causal sample $P_t^C$ is performed by the iteration of the causal integration equation ($3^C$) which corresponds to a linear combination of the noisy causal and present samples, whereto weights have been applied, a causal weight being evaluated as a probability of continuity between the causal sample whereto said weight is attached and the present sample, the weight of the noisy present sample being fixed at 1. In order to evaluate a causal weight, the probability of continuity between a given causal sample and the present sample can be evaluated as the product of the probabilities of continuity between the successive samples after the given sample until the present sample.

Furthermore, the evaluation of the filtered present anti-causal sample $P_t^A$ is performed by calculation of the anti-causal integration equation ($3^A$), corresponding to the evaluation of a linear combination between the filtered present causal sample $P_t^C$ and the anti-causal noisy sample $I_{t+1}^A$ whereto a specific weights has been attached.

Actually, the equation (1) given above can also be written as:

$$P_t^A = \frac{\left(\sum_{j=t-ko}^{j=t-1} b_j^C\right) P_t^C + b_{t+1}^A \times I_{t+1}^A}{\left(\sum_{j=t-ko}^{j=t-1} b_j^C\right) + b_{t+1}^A}$$

It has already been stated that:

$$b_{t+1}^A = \alpha_t^C \quad (2')$$

$$1 \bigg/ \sum_{j=t-ko}^{j=t-1} b_j^C = K_t^C$$

Assuming that:

$$\frac{b_{t+1}^A}{\left(\sum_{j=t-ko}^{j=t-1} b_j^C\right) + b_{t+1}^A} = \frac{\alpha_t^A}{(1/K_t^C) + \alpha_t^A} = K_t^A$$

the linear expression of the filtered anti-causal sample is then obtained:

$$P_t^A = (1 - K_t^A) P_t^C + K_t^A \times I_{t+1}^A$$

its weights being $(1-K_t^A)$ for $P_t^C$ et $K_t^A$ for $I_{t+1}^A$. The anti-causal gain $K_t^A$ in this case depends exclusively on the anti-causal continuity coefficient $\alpha_t^A$ and on the sum of the weights attached to the samples involved in the causal linear filtering operation.

In a general version of the invention, the filtered sample $P_t^C$ can be supplied by any linear filtering process (be it recursive or not) whose inverse of the sum of the coefficients provides a factor utilized as the causal gain $K_t^C$.

Formulation of the causal continuity coefficient $\alpha_t^A$

The causal continuity coefficient $\alpha_t^C$ is defined as a function of the difference $\Delta^C = |I_t^P - P_{t-1}^C|$ ($6^C$).

It is advantageous to determine whether the difference $\Delta^C$ relates to a discontinuity such as D in FIG. 3A or whether it relates exclusively to noise.

In order to determine the noise participation, the difference $\Delta^C$ is normalized by a factor $S_t^C$ which takes into account the variance of the noise relative to each sample of this discontinuity $\Delta^C$. The standard deviation of the noise, referred to as $\sigma_B$ and measured in intensity levels for each sample $I_j$, can be estimated by means of any known method or should be estimated a priori.

According to a method proposed, by way of example, for the determination of the standard deviation $\sigma_B$ of the noise in relation to FIG. 3C, a noisy signal is represented by the curve $I(\tau)$; the mean amplitude of this signal approximately equals its arithmetical mean $m_B$ evaluated over a number of N samples, i.e. between the present instant j=t, for example, and the past instant j=t−N+1, taking into account the noisy samples $I_{t-N+1}^C \ldots I_t^P$;

therefore, this offers the mean value searched $$m_B \simeq \frac{1}{N} \sum_{j=t-N+1}^{j=t} I_j \quad (8^C)$$

The standard noise deviation $\sigma_B$ is the mean deviation between a noisy signal and its mean value $m_B$. The variance of the noise, referred to as $\sigma_B^2$ and being the mean value of the square of the intensity deviations due to the noise of the N samples considered with respect to the mean value $m_B$, can be calculated by means of the relation:

$$\sigma_B^2 \simeq \frac{1}{N} \sum_{j=t-N+1}^{j=t} (I_j - m_B)^2 \quad (9^C)$$

The standard noise deviation $\sigma_B$ is then obtained by calculation of the square root of the variance of the noise:

$$\sigma_B = \sqrt{\frac{1}{N} \sum_{j=t-N+1}^{j=t} (I_j - m_B)^2} \quad (10^C)$$

In accordance with the invention, the variance of the noise contribution involved in the difference $\Delta^C$ is formulated as:

$$\sigma_B^2 \times \frac{2}{2 - K_{t-1}^C}$$

in the steady state; this value is used as an approximation for the normalization of $\Delta^C$. The normalization factor of the difference $\Delta^C$ is then given by the relation:

$$S_t^C = \sigma_B \sqrt{\frac{2}{2 - K_{t-1}^C}} \qquad (11^C)$$

In the equation ($5^C$), the discontinuity coefficient $\alpha_t^C$, therefore, is a function of a difference $\Delta^C$ given by the relation ($6^C$), normalized by an approximation $S_t^C$ of the standard noise deviation $\sigma_B$ in order to take into account the fact that the difference $\Delta^C$ is influenced by the noise. To this end, the calculation of the coefficient $\alpha_t^C$ comprises the determination of the standard noise deviation $\sigma_B$ from the mean value.

The strength of the filtering method proposed in accordance with the invention and based on the calculation of the causal integration function ($3^C$), in association with the relations ($4^C$) and ($5^C$), resides notably in the fact that the expression $\alpha_t^C$ is normalized as proposed. Because for this normalization not only the variance of the noise of the present sample $\alpha_t^C$ is taken into account but also the variance of the noise of the filtered sample $P_{t-1}^C$, the equation ($5^C$), giving the gain factor, enables estimation of the residual noise for each filtered sample.

The recursive integration function ($3^C$) can now be readily calculated, because it depends exclusively on the gain factor $K_t^C$ given by the equation ($4^C$). The gain factor $K_t^C$ itself depends exclusively on the gain factor $K_{t-1}^C$ already calculated in the past and on the continuity coefficient $\alpha_t^C$. The continuity coefficient $\alpha_t^C$ also depends on the already calculated gain factor $K_{t-1}^C$, so that the continuity coefficient $\alpha_t^C$ must first be calculated, after which the gain equation $K_t^C$ can be readily calculated by means of the continuity coefficient $\alpha_t^C$ and the filtered causal sample $P_t^C$ can subsequently be easily calculated by means of the relation ($3^C$).

Definition of the function $F^C$

For the calculation of the equation ($5^C$), giving $\alpha_t^C$, the function $F^C$ is defined as described hereinafter.

The argument of the function $F^C$ is denoted as $z^C$:

$$z^C = \frac{\Delta^C}{S_t^C} = \left| \frac{I_t^P - P_{t-1}^C}{\sigma_B \sqrt{\frac{2}{2 - K_{t-1}^C}}} \right| \qquad (12^C)$$

The function $F^C(z^C)$ is traced, by way of example, in the FIGS. 6A to 6D by plotting its values on the ordinate and by plotting z on the abscissa.

The function $F^C(z^C)$ first has a constant value $F^C\text{max}$ when $0 \leq z^C \leq 1$; subsequently, the function $F^C(z^C)$ decreases to a value $F^C\text{min}$ for $1 < z^C$. The value $F^C\text{max}$ is such that $F^C\text{max} \leq 1$. The value $F^C\text{min}$ is such that $0 \leq F^C\text{min}$. Examples of such functions $F^C(z^C)$ are given hereinafter.

EXAMPLE I

The function $F^C(z^C)$ is constant and equal to a value $F^C\text{max}=1$ if $0 \leq z^C \leq 1$; subsequently, the function $F^C(z^C)$ is chosen so as to decrease to a value $F^C\text{min}=0$ if $1 \leq z^C$. The function $F^C(z^C)$ preferably has, in this region, a Gaussian shape applied by a normalization factor, so that: if $1 \leq z^C$, then $$F^C(z^C) = \exp\left(\frac{z^{C2}}{0.75}\right)$$

EXAMPLE II

The function $F^C(z^C)$ is constant and equal to a value $F^C\text{max}$ smaller than 1; for example $F^C\text{max}=0.85$ if $0 \leq z^C < 1$; subsequently, the function $F^C(z^C)$ decreases if $1 \leq z^C$. The function $F^C(z^C)$ cannot decrease beyond, for example 0.10. The function $F^C(z^C)$ may in that case be a shifted Gaussian curve.

EXAMPLE III

The function $F^C(z^C)$ is constant and equal to a value $F^C\text{max}$ smaller than 1, but close to 1, so that $F^C\text{max}=0.85$ if $0 \geq z^C \geq 1$. Subsequently, the function $F^C(z)$, linearly decreases to a value $F^C\text{min}$ near 0; for example, $F^C\text{min}=0.10$; it reaches this value, for example for $z^C=2$. Subsequently, the function $F^C(z^C)$ is linearly constant and equal to $F^C\text{min}=0.10$ for $2 < z^C$.

EXAMPLE IV

The function $F^C(z^C)$ is a segmented linear function which is an approximation of the function of example I or of the function of example II.

The function $F^C(z^C)$ may also be chosen from other appropriate forms whose definition is to be decided by a person skilled in the art.

The function $F^C(z^C)$ controls the filtering power. When $F^C\text{max}=1$, the filtering power is maximum. When $F^C\text{max}$ is smaller than 1, the filtering power is slightly limited. When $F^C\text{min}$ is larger than zero, the filtering power is never zero.

The calculation of the second system of anti-causal filtering equations, formed by the relations ($3^A$), ($4^A$) and ($5^A$), is quite analogous to the calculation of the relations ($3^C$), ($4^C$) and ($5^C$) of the system of causal filtering equations.

It is to be noted simply that the formulation of the anti-causal gain equation $K_t^A$ deviates from the formulation of the causal gain equation $K_t^C$ because of the specific position of the anti-causal continuity coefficient $\alpha_t^A$ in the gain equation $K_t^A$.

As has already been shown in relation to causal filtering, the power of the anti-causal filtering method resides particularly in the method of calculation of the anti-causal continuity coefficient $\alpha_t^A$. Two particularly attractive formulations will be given hereinafter.

Formulation No. 1 of the continuity coefficient $\alpha_t^A$

In this first formulation, the anti-causal continuity coefficient is called $\alpha_t^{A1}$. The intensity difference as $\Delta^{A1}$ is evaluated between the noisy intensity $i_{t+1}^A$ observed at the future instant t+1 and the intensity obtained by causal filtering $P_{t-1}^C$ of the same pixel in the causal filtered image corresponding to the instant t−1. The difference $\Delta^{A1}$ thus takes into account samples separated by two instants:

$$\Delta^{A1} = |I_{t+1}^A - P_{t-1}^C| \qquad (6^{A1})$$

The continuity coefficient No. 1 is given by:

$$\alpha_t^{A1} = F^A \frac{(|I_{t+1}^A - P_{t-1}^C|)}{\sigma_B \sqrt{\frac{2}{2-K_{t-1}^C}}} = F^A\left(\frac{\Delta^{A1}}{S_t^C}\right) = F^A(Z^{A1}) \quad (5^{A1})$$

where $$Z^{A1} = \Delta^{A1}/S_t^C \quad (12^{A1})$$

where $F^A(Z^{A1})$ is a so-called anti-causal function which is taken to be of the same type as the causal function $F^C(z^C)$ described above.

This relation $(5^{A1})$ includes elements which are already known because of the causal filtering: $P_{t-1}^C$, $I_{t+1}^A$, $\sigma_B$ and $S_t^C$.

After calculation of the anti-causal continuity coefficient $\alpha_t^{A1}$ in conformity with the relation $(5^{A1})$, the gain $K_t^A$ is calculated in conformity with the relation $(4^A)$, and finally the filtered intensity $P_t^A$ at the current instant is provided by calculation of the anti-causal integration equation $(3^A)$ while taking into account the filtered intensity $P_t^C$, resulting from the described causal filtering, as given by calculation of the causal integration equation $(3^C)$.

The FIGS. 4A, 4C both show a filtered temporal signal $P(\tau)$ obtained on the basis of a noisy temporal signal $I(\tau)$ including at least one intensity discontinuity D due to a movement as illustrated in FIG. 3A.

This filtering operation is performed by means of a first system of causal filtering $(3^C)$, $(4^C)$, $(5^C)$, followed by a second, anti-causal filtering system $(3^A)$, $(4^A)$ while applying the first formulation $(5^{A1})$.

Figure 6A:
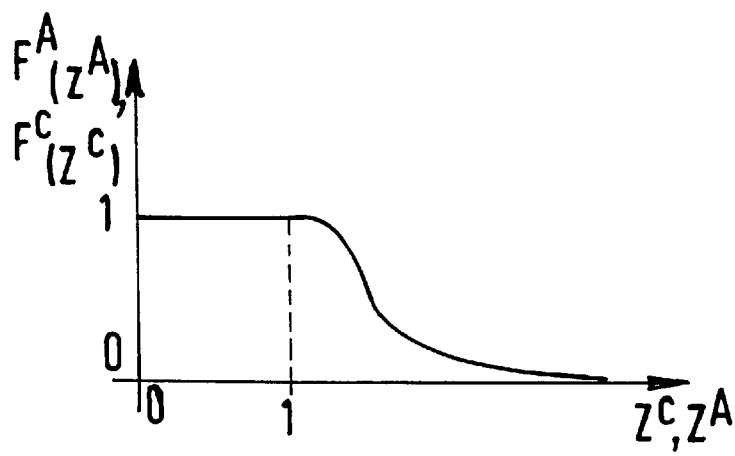
FIGS. 6A to 6D show various feasible examples of the function F.

FIG. 4A shows the filtered temporal signal $P(\tau)$ in the conditions where $F^A(Z^{A1})$ and $F^C(Z^C)$ are both a function analogous to that of the example I illustrated by FIG. 6A.

Referring to FIG. 4A, the causal filtering produces smoothing of the temporal signal, to the left of the discontinuity D, in the causal direction from t–3 towards t–ko; subsequently, because of the discontinuity D, the causal filtering is not capable of carrying out the filtering of the noisy sample $I_{t-2}^C$ at t–2 because it has "forgotten" the past which is formed by the samples $I_{t-3}^C$, $I_{t-4}^C$ etc.; the causal filtering is very effective at $I_{t-3}^C$ of the curve of the temporal signal and to the left of this sample, after which the signal is directly the noisy signal $I_{t-2}^C$, at t–2, because at that point the causal filtering produces only the noisy intensity observed which has not been modified by the data of the past. Subsequently, the causal filtering produces a signal which is smoothed again to the right of the sample $I_{t-2}^C$, starting from the next point, at t–1, of the temporal signal, where the sample at t–2 can be taken into account because of the fact that there is no intensity discontinuity between the instants t–2 and t–1.

Therefore, after causal filtering the first noise tooth at $I_{t-2}^C$ remains at the instant t–2, because of the fact that the weight $b_{t-3}^C$ assigned to the signal at t–3 is zero since the intensity difference between t–2 and t–3 is large.

Subsequently, because of the anti-causal filtering, the effectiveness of the filtering is complete as from the next point t–1. The fact that the data of the anti-causal signal $I_{t+1}^A$ is taken into account, i.e. the future data, enables improved filtering of the signal as from the first point, without discontinuity at t–1, as shown in FIG. 4A.

In an alternative version of the latter embodiment of the invention the filtering power can be changed at will by changing the values of $F^C$min, $F^C$max, $F^A$min, $F^A$max so as to reduce as well as possible the residual noise intensity tooth, to the right of the intensity discontinuity D of the temporal signal, while preserving as perfect as possible smoothing of this temporal signal.

Thus, in accordance with the invention the past can only be forgotten "to a certain extent", so that the causal filtering cannot be completely zero at $I_{t-2}^C$.

Figure 6B:
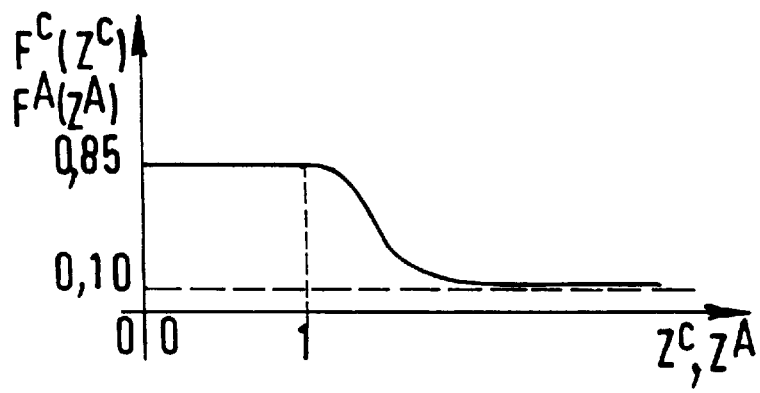
Figure 6C:
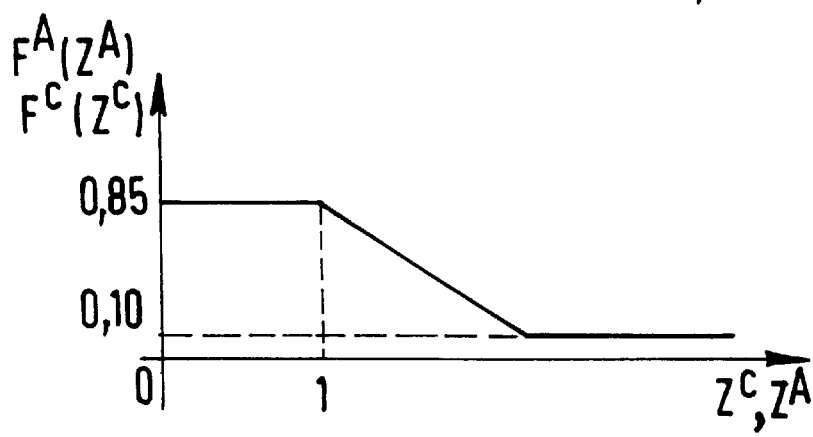
Figure 6D:
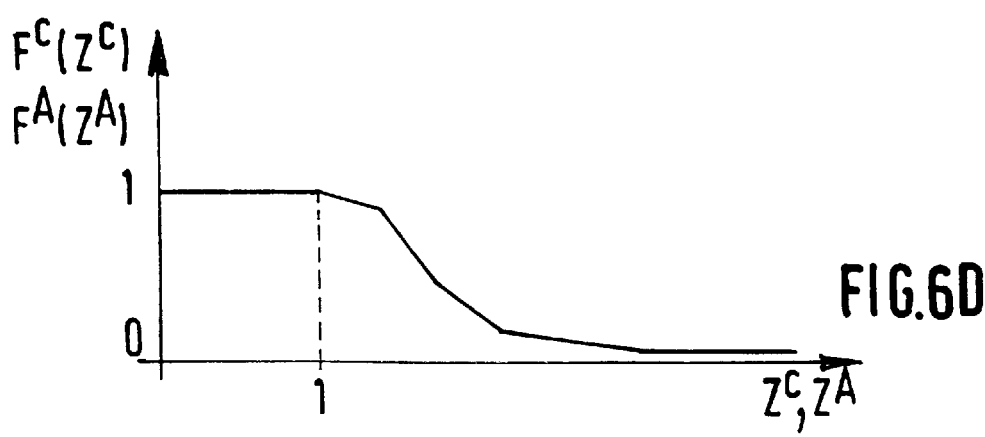

Referring to FIG. 4C, showing the result of the filtering of the signal of FIG. 3A while utilizing the functions $F^C(z^C)$ and $F^A(Z^{A1})$, where $F^A$max=$F^C$max=0.85 and $F^A$min= $F^C$min=0.10 as illustrated in FIG. 6B, it appears that the first noise tooth at $I_{t-2}^C$ after the discontinuity D is reduced because of the fact that the functions $F^A(Z^{A1})$ and $F^C(z^C)$ are never zero, because in this example they are at least equal to 0.10. Therefore, the data at the instant t–3 is always taken into account and enables the filtering, to at least some extent, of the signal at the instant t–2 after the intensity discontinuity D.

Referring to FIG. 3B, the noisy temporal signal $I(\tau)$ may also comprise a noise peak D' which appears, for example at the instant t–2. The causal filtering does not enable the discontinuity D', caused by a noise peak in a noisy temporal signal of FIG. 3B, to be distinguished from the discontinuity D caused by a movement in the noisy temporal signal of FIG. 3A. The anti-causal filtering will correct this deficiency.

Because in the anti-causal filtering at the instant t–2, at which the apex of the noise peak $I_{t-2}^C$ must be filtered, the continuity coefficient $\alpha_t^{A1}$ is a function of the discontinuity of the intensity between the preceding instant t–3 and the next instant t–1, the anti-causal filtering at t–2 produces a filtered intensity which takes into account the filtered intensity at t–3 and the noisy intensity at t–1 which are near one another.

Figure 4B:
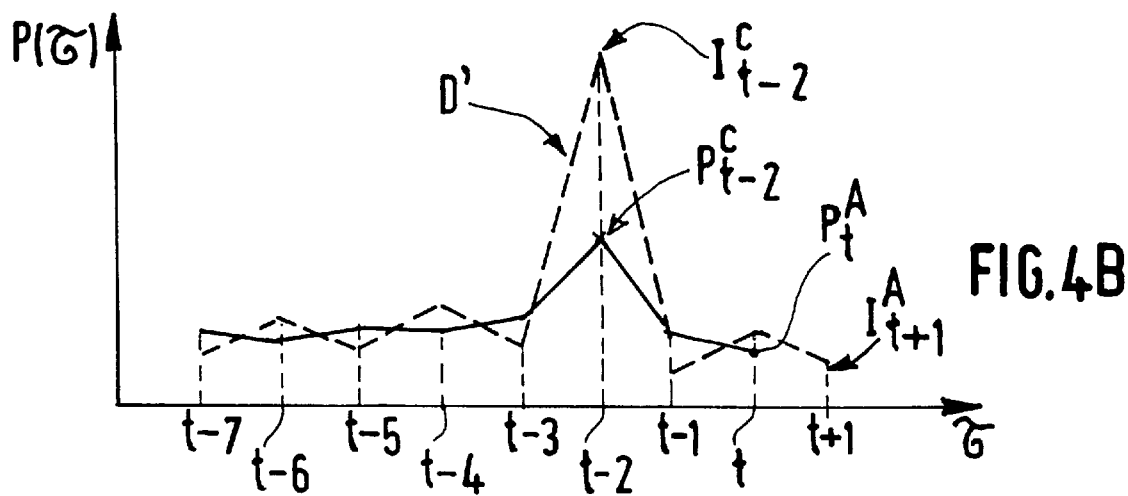
FIG. 4B shows the filtered temporal signal corresponding to the noisy signal of FIG. 3B in the first embodiment of the invention.
Figure 5B:
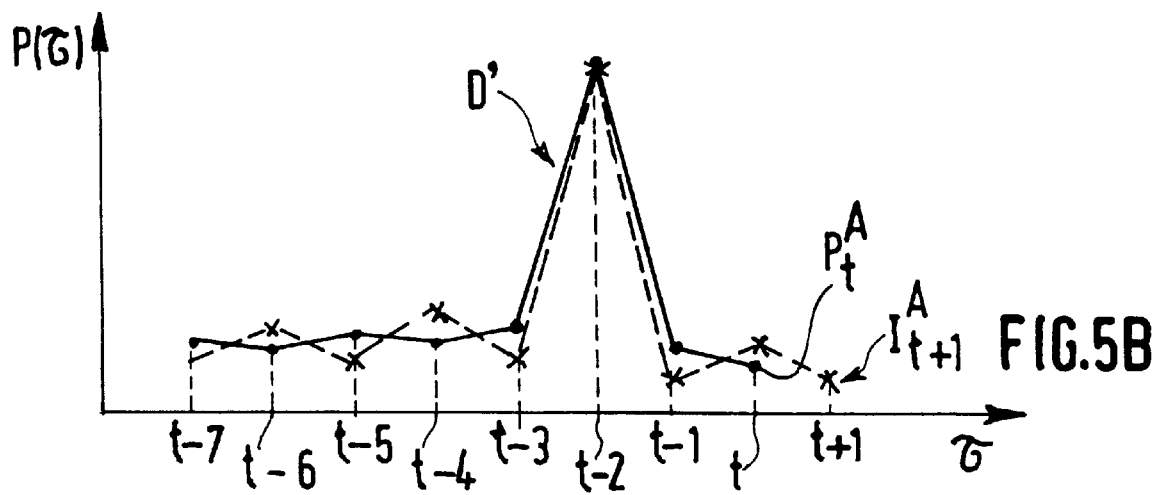
FIG. 5B shows the filtered temporal signal corresponding to the noisy temporal signal of FIG. 3B in the second embodiment of the invention.

Therefore, the noise peak D' is smoothed by said causal+ anti-causal filtering with the aid of the continuity coefficient No. 1 as shown in FIG. 4B.

Formulation No. 2 of the continuity coefficient $\alpha_t^{A2}$

According to this second formulation, the anti-causal continuity coefficient is referred to as $\alpha_t^{A2}$. The intensity difference $\Delta^{A2}$ is evaluated between the noisy intensity $I_{t+1}^A$ observed at the future instant t+1 and the intensity obtained by causal filtering $P_t^C$ of the same pixel in the present image at the instant t. The difference $\Delta^{A2}$ thus takes into account samples separated by one instant only:

$$\Delta^{A2} = |I_{t+1}^A - P_t^C| \quad (6^{A2})$$

The continuity coefficient No. 2 is given by:

$$\alpha_t^{A2} = F^A \frac{(|I_{t+1}^A - P_t^C|)}{\sigma_B \sqrt{\frac{2}{2-K_{t-1}^C}}} = F^A\left(\frac{\Delta^{A2}}{S_t^C}\right) = F^A(Z^{A2}) \quad (5^{A2})$$

where $$Z^{A2} = \Delta^{A2}/S_t^C \quad (12^{A2})$$

where $F^A(Z^{A2})$ is a so-called anti-causal function which is taken to be of the same type as the causal the function $F^C(z^C)$ described above.

This relation $(5^{A2})$ involves elements which are already known due to the causal filtering: $P_t^C$, $I_{t+1}^A$, $\sigma_B$ and $S_t^C$.

After calculation of the anti-causal continuity coefficient $\alpha_t^{A2}$ in conformity with the relation $(5^{A2})$, the gain $K_t^A$ is calculated in conformity with the relation $(4^A)$, and finally the anti-causal filtered intensity $P_t^A$ is produced by calculation of the anti-causal integration equation $(3^A)$ while taking into account the filtered intensity $P_t^C$, resulting from the previously described causal filtering, as given by calculation of the causal integration equation ($3^C$).

Figure 5C:
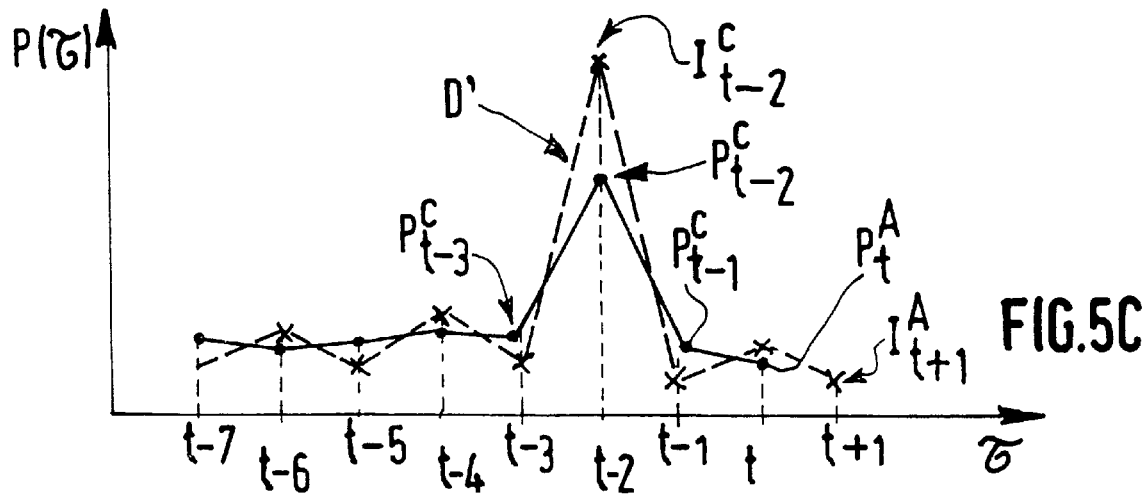
FIG. 5C shows the temporal signal of FIG. 3B filtered in a further version of said second embodiment.

Each of the FIGS. 5A, 5C shows a filtered temporal signal $P(\tau)$ obtained on the basis of a noisy temporal signal $I(\tau)$ having at least one intensity discontinuity D due to a movement as illustrated in FIG. 3A.

This filtering operation is performed by means of the first causal filtering system ($3^C$), ($4^C$), ($5^C$), followed by the second anti-causal filtering system ($3^A$), ($4^A$) while applying the second formulation ($5^{A2}$).

FIG. 5A shows the filtered temporal signal $P(\tau)$ in the conditions in which $F^A(Z^{A2})$ and $F^C(Z^C)$ are both a function analogous to that of the example I illustrated by FIG. 6A.

Referring to FIG. 5A, the causal filtering produces the same smoothing of the temporal signal as described with reference to FIG. 4A.

Therefore, after causal filtering the first noise tooth remains at the instant t−2 the weight $b_{t-3}^C$ assigned to the signal at t−3 is zero since the intensity difference between t−2 and t−3 is large.

The anti-causal filtering operation will correct this deficiency. The fact that the data of the anti-causal signal is taken into account, i.e. data arriving in the future, enables improved filtering of the signal for this noise tooth to the right of the discontinuity D, as shown in FIG. 5A, and also enables excellent filtering directly at this point $I_{t-2}^C$.

The use of the formulation No. 2 for the continuity coefficient $\alpha_t^{A2}$ does not enable suitable filtering of a noise peak D' as shown in FIG. 3B if the functions $F^A(Z^A)$ and $F^C(Z^C)$ chosen are those of the example I illustrated by FIG. 6A.

However, as has already been demonstrated, the filtering power can be changed by changing the values $F^C_{min}$, $F^C_{max}$, $F^A_{min}$, $F^A_{max}$.

Thus, considering FIG. 5C which is the result of the filtering of the signal shown in FIG. 3B while utilizing the functions $F^C(Z^C)$ and $F^A(Z^{A2})$ with $F^A max = F^C max = 0.85$ and $F^A min = F^C min = 0.10$, as illustrated in FIG. 6B, the noise peak D' is reduced because the functions $F^A(Z^{A2})$ and $F^C(Z^C)$ are never zero since the data at the instant t−3 is always taken into account and always enables the signal of the noise peak D' to be filtered to a given extent at the instant t−2.

In all cases, the temporal filtering "with future" and with the possibility of choosing a filtering power adapted in conformity with the invention, enables extremely efficient dealing with the problem relating to an intensity discontinuity of the type D or to a noise peak such as D'.

III/Device for carrying out the method.

Figure 7A:
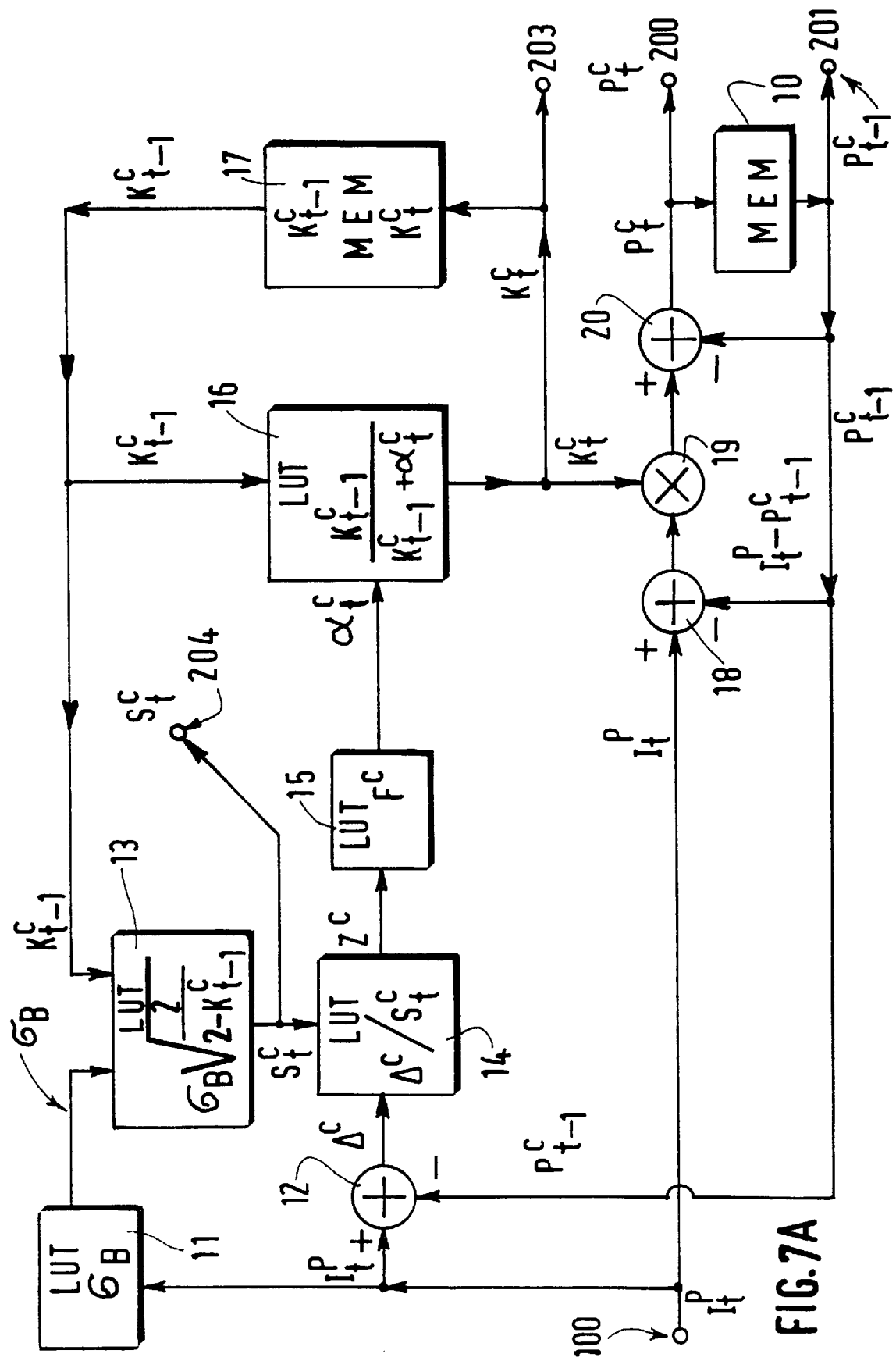
FIGS. 7A and 7B illustrate, in the form of functional blocks, a device for carrying out the temporal filtering method with a causal component and an anti-causal component.
Figure 7B:
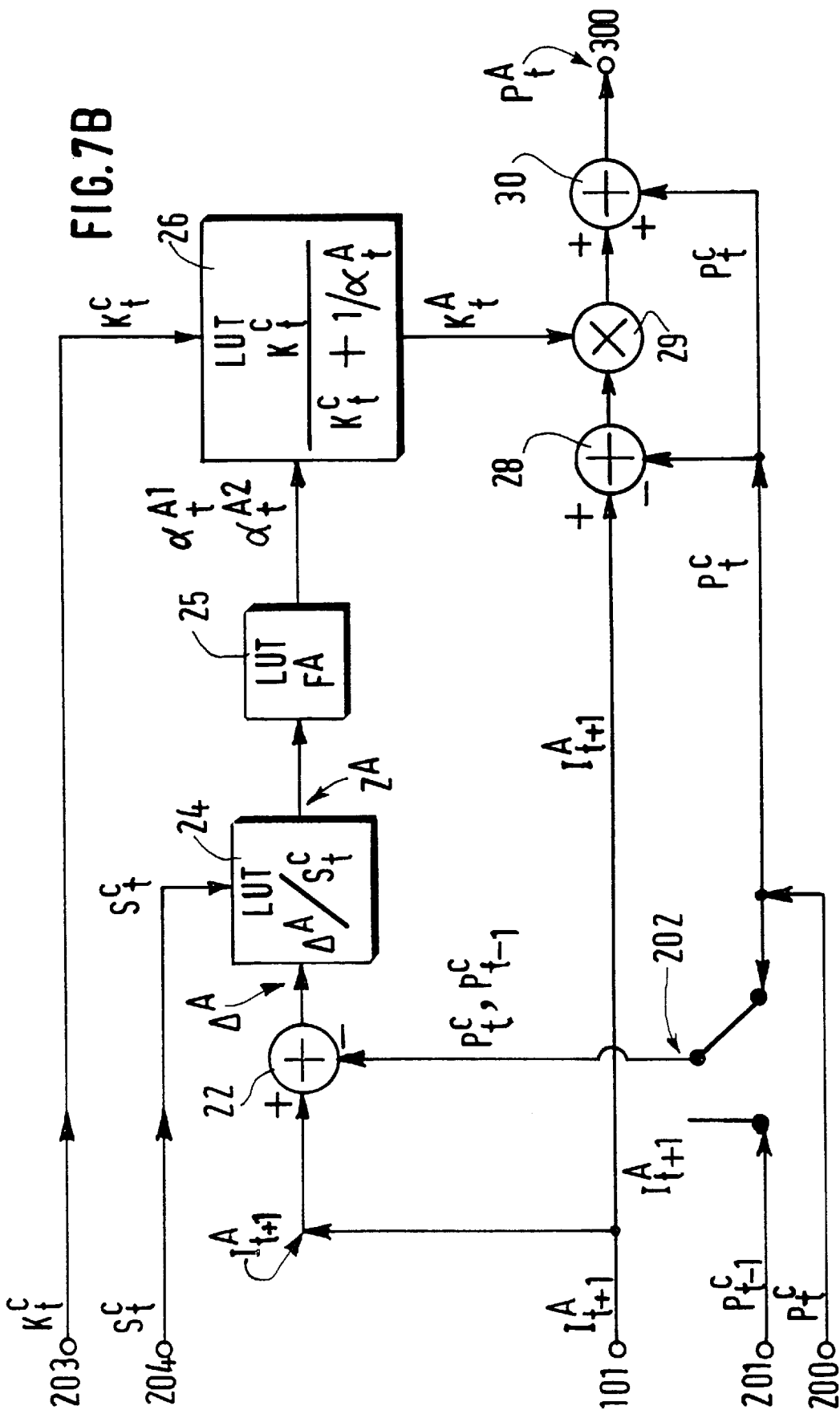

The FIGS. 7A, 7B show a simple device in the form of functional blocks for carrying out the described filtering method. The device comprises two principal sub-assemblies: a causal sub-assembly for performing the causal filtering as shown in FIG. 7A, and an anti-causal sub-assembly for performing the anti-causal filtering as shown in FIG. 7B.

The noisy intensity $I(\tau)$ is measured at the pixel $A_j(x, y)$ having the coordinates x, y in each of the images $I_j$ of the sequence, i.e. one after the other. For the processing of the present image, observed at the instant t, the noisy intensity $I_t^P$ is applied to the input 100 of the device in the causal sub-assembly shown in FIG. 7A.

Referring to FIG. 7A, representing the causal sub-assembly, said present noisy intensity $I_t^P$ is first applied to a tabulated function $\sigma_B$ in a look-up table LUT 11 which supplies the standard noise deviation $\sigma_B$ of the noisy signal $I_t^P$. The standard noise deviation $\sigma_B$ is available at the output of the Table 11.

The causal gains are stored in a memory MEM 17. The memory MEM 17 comprises an output for the gains $K_{t-1}^C$ of the preceding instant, for each pixel, and an input for receiving the gains $K_t^C$ calculated for the present instant t.

The device comprises a look-up table LUT 13 which contains tabulated values in order to supply the normalization value directly:

$$S_t^C = \sigma_B \sqrt{\frac{2}{2 - K_{t-1}^C}} \qquad (11^C)$$

as soon as the value $\sigma_B$ from the Table LUT 11 is entered therein and the value of the gain $K_{t-1}^C$ from the output of the memory MEM 17. The value $S_t^C$ constitutes the denominator of the expression ($5^C$), enabling the calculation of the continuity coefficient $\alpha_t^C$. The denominator value $S_t^C$ is available at the output of the Table LUT 13 and is entered into the look-up table LUT 14.

The device comprises a second memory MEM 10 for storing the intensities filtered at the various instants for each pixel treated.

At the instant t, at which an image is observed whose filtered causal intensity $P_t^C$ is to be calculated, the memory MEM 10 already contains the filtered intensity $P_{t-1}^C$ corresponding to the preceding instant and hence outputs $P_{t-1}^C$ on its output 201.

The intensity filtered at the preceding instant $P_{t-1}^C$ is applied to the adder 12 at the same time as the noisy intensity $I_t^P$ observed at the instant t and originating from the input 100 of the causal sub-assembly. The adder 12 calculates the difference between the two intensities, one noisy at the instant t, denoted as $I_t^P$, and the other filtered at the instant t−1, denoted as $P_{t-1}^C$, and supplies said difference via its output.

The Table LUT 14 takes the absolute value of the difference supplied by the adder 12 and also receives the denominator $S_t^C$. The Table LUT 14 then outputs the argument $z^C$ of the function $F^C(z^C)$:

$$\frac{\Delta^C}{S_t^C} \qquad (12^C)$$

The look-up table LUT 15 contains the chosen function $F^C(z^C)$ in tabulated form. The input of the table LUT 15 receives the argument $z^C$ and supplies the continuity coefficient $\alpha_t^C$ given by:

$$F^C\left(\frac{\Delta^C}{S_t^C}\right)$$

The table LUT 16 contains the formulation tabulated so as to supply the gain $K_t^C$ at the instant t on the basis of the gain $K_{t-1}^C$ at the preceding instant, arriving from the memory MEM 17, and on the basis of the continuity coefficient $\alpha_t^C$ arriving from the table LUT 15. This gain:

$$K_t^C = \frac{K_{t-1}^C}{K_{t-1}^C + \alpha_t^C} \qquad (4^C)$$

is supplied via the output of the table LUT 16 and applied on the one hand to the memory MEM 17 so as to replace the value of the gain $K_{t-1}^C$ of the preceding instant, and on the other hand to a multiplier 19.

The causal integration function ($3^C$) can now be calculated.

The adder 18 first receives the noisy signal observed at the instant t, denoted as $I_t^P$ and originating from the input 100, and the signal filtered at the preceding instant t−1 and originating from the output 201 of the memory MEM 10. The adder 18 supplies the difference:

$$I_t^P - P_{t-1}^C$$

This difference is applied from the adder 18 to the multiplier 19 at the same time as the gain $K_t^C$ from the table LUT 16. The multiplier 19 forms the product:

$$K_t^C \times (I_t^P - P_{t-1}^C)$$

and outputs the result.

The adder 20 receives on the one hand the product from the multiplier 19 and on the other hand the signal already filtered at the preceding instant, denoted as $P_{t-1}^C$ and originating from the memory MEM 10. The adder applies the value of the intensity filtered at the instant t to the output 200 of the causal sub-assembly. In the memory MEM 10 this filtered value $P_t^C$ will also replace the intensity filtered at the instant t−1.

As has already been stated in the above description of the temporal filtering method, it is not absolutely necessary to have a causal sub-assembly as described above available so as to supply a present filtered sample $P_t^C$. Any linear filter, recursive or non-recursive, applied to the temporal signal formed by causal noisy samples $I_j^C$ and the present noisy sample $I_t^P$ may suffice. The causal gain $K_t^C$ is then taken to be equal to the inverse of the sum of the coefficients associated with such a linear filter.

In accordance with the invention, the causal sub-assembly is preferably used. The invention concerns specifically the anti-causal sub-assembly described hereinafter, as well as the use of such an anti-causal sub-assembly for a first recursive or non-recursive linear filtering sub-assembly, supplying a first value of the present filtered sample which is to be enhanced by the anti-causal filtering.

Reference is now made to FIG. 7B which shows the anti-causal sub-assembly which comprises first of all an input 101 for the noisy intensity $I_{t+1}^A$, measured at the so-called future instant at the coordinates x, y in the so-called future image $J_{t+1}^A$, being the last image observed in the sequence. The device also comprises an input 200 for the filtered causal intensity $P_t^C$ of the present instant t which is supplied by the linear filter or by the causal sub-assembly, an input 201 for the filtered intensity $P_{t-1}^C$ of the preceding instant which, in the preferred embodiment, is stored in the memory MEM 10 of the causal sub-assembly, an input 203 for the causal gain $K_t^C$ which, in the preferred embodiment, is supplied by the LUT 16 of the causal sub-assembly, and an input 204 for the value of the denominator $S_t^C$ which, in the preferred embodiment, is supplied by the LUT 13 of the causal sub-assembly. When use is made of a linear filter other than the causal sub-assembly, the values $P_{t-1}^C$, $K_t^C$, et $S_t^C$ may be stored and supplied by any appropriate means known to a person skilled in the art.

In the anti-causal sub-assembly the filtered intensities $P_{t-1}^C$ of the preceding instant and $P_t^C$ are directed via an OR-gate so as to be applied, with the intensity $I_{t+1}^A$ of the future instant, to the adder 22 which supplies the absolute value of their difference $\Delta^A$ which can thus have either the value $\Delta^{A1}$ of the formule ($6^{A1}$) or the value $\Delta^{A2}$ of the formule ($6^{A2}$).

The absolute value of the difference $\Delta^A$ is entered, with the denominator $S_t^C$, in a LUT table 24 in which the ratio $\Delta^A/S_t^C$ is tabulated and which outputs the value of the argument $Z^A$.

The argument $Z^A$ is then entered into a table LUT 25 which contains the tabulated function $F^A(Z^A)$ and outputs either the first continuity coefficient $\alpha_t^{A1}$ of the formule ($5^{A1}$) or the second discontinuity function $\alpha_t^{A2}$ of the formule ($5^{A2}$), depending on whether the intensity filtered at the preceding instant $P_{t-1}^C$ or that filtered at the present instant $P_t^C$, respectively, has been applied to this calculation circuit.

The calculated continuity coefficient, $\alpha_t^{A1}$ or $\alpha_t^{A2}$, is entered, at the same time as the causal gain $K_t^C$ from the input 203, into a table LUT 26 which contains the tabulated function:

$$\frac{K_t^C}{K_t^C + 1/\alpha_t^A} \qquad (5^A)$$

so that the anti-causal gain $K_t^A$ can be derived from its output.

The anti-causal integration function ($4^A$) is subsequently calculated. The present causal filtered intensity $P_t^C$ is applied, with the noisy intensity $I_{t+1}^A$, to the adder 28 which calculates the difference therebetween. This difference is subsequently applied, with the anti-causal gain $K_t^A$ just calculated, to a multiplier 29; subsequently, the result of this multiplication is added, by the adder 30, to the filtered causal intensity $P_t^C$. The result of the addition is the filtered anti-causal intensity $P_t^A$ which constitutes the result of the filtering operation in accordance with the invention.

This filtering operation is performed for the pixels to be treated of the current image $J_t^P$ and this image is thus reconstructed with a small delay with respect to the last image $J_{t+1}^A$ observed. If the rate of formation of the images is, for example ⅓₀ second, this delay is absolutely not perceptible.

It is to be noted that the causal sub-assembly preferably used as described above necessitates only the storage of the filtered causal sample $P_{t-1}^C$ and of the causal gain $K_{t-1}^C$ from the previous instant to the present instant and, moreover, requires only the value of the noisy intensity of the present instant which need not be stored. The noise variance $\sigma_B$ must be provided by an appropriate method so as to enable tabulation of $S_t^C$.

It is also to be noted that the anti-causal sub-assembly, being the specific object of the invention, only necessitates the supply of values $S_t^C$ which can be tabulated on the basis of the noise variance $\sigma_B$, the supply of the anti-causal noisy sample $I_{t+1}^A$ which need not be stored, the supply of filtered samples $P_{t-1}^C$ et $P_t^C$ which may originate from a memory, and the supply of the gain $K_t^C$ which may originate from a memory.

After the filtering of the various pixels to be treated in the present image, this filtered image can be displayed on the monitor 7 of the display device shown in FIG. 1. The various images of the sequence can thus be displayed after their respective filtering.

We claim:

1. A device for temporal filtering of noise in images which are part of a sequence of images, each image being in the form of a matrix of pixels, comprising:

an image processing system for supplying a noisy digitized intensity ($I_t^P$), referred to as a noisy present sample, of a pixel ($A_t(x,y)$) having a given location (x,y) in an image ($J_t^P$) at said present instant (t), and an anti-causal noisy intensity ($I_{t+1}^A$) of the pixel which is later than the present pixel, referred to as an anti-causal sample, of the same location (x,y) in the matrix of the later image, a first sub-assembly, which is referred to as a causal sub-assembly, whose input receives the present noisy sample ($I_t^P$) and comprises linear filtering means with weights for evaluation and for delivering on one output a first filtered value, referred to as a causal filtered sample ($P_t^C$), of the present sample $I_t^P$), a filtered sample ($P_{t-1}^C$) of the preceding instant on another output, and a causal gain factor ($K_t^C$) equal to the inverse of the sum of the weights of this linear filtering on another output and, a second sub-assembly, referred to as an anti-causal sub-assembly, an input of which receives the causal filtered sample of the preceding instant ($P_{t-1}^C$), a further input of which receives the present causal filtered sample ($P_t^C$), and another input of which receives the anti-causal noisy sample ($I_{t+1}^A$), and comprises linear filtering means with weights for evaluating an anti-causal integration relation with the causal gain factor ($K_t^C$), and for delivering on its output a second value which is referred to as a filtered anti-causal sample ($P_t^A$) and is the filtered sample of the noisy present sample ($I_t^P$).

2. A device as claimed in claim 1, comprising means for evaluating the variance of the noise of the samples, and also comprising, included in the anti-causal sub-assembly, the following elements for the evaluation of the anti-causal integration relation:

an adder for determining the absolute value of an anti-causal difference ($\Delta^{A1}$, $\Delta^{A2}$) between the noisy anti-causal sample ($I_{t+1}^A$) and either (i) said filtered causal sample ($P_t^C$) of the present instant (t), or (ii) the filtered causal sample ($P_{t-1}^C$) of the preceding instant (t−1), tables for determining an anti-causal discontinuity coefficient ($\alpha_t^A$) as a decreasing function ($F^A$) of the anti-causal difference ($\Delta^{A1}$, $\Delta^{A2}$) normalized by the factor ($S_t^C$) depending on the variance of the noise ($\alpha_B$), a table for determining an anti-causal gain factor ($K_t^A$) of the present instant (t) which is equal to the quotient of the present causal gain factor ($K_t^C$) and the sum of said present causal gain factor and the inverse of said anti-causal discontinuity coefficient ($\alpha_t^{A1}$) of the present instant (t), and adders and a multiplier for determining the sum of said present filtered causal sample ($P_t^C$) and the product of said anti-causal gain factor ($K_t^A$) and said present filtered causal sample ($P_t^C$).

3. A device as claimed in claim 1, in which the first causal sub-assembly comprises:

an adder for determining an absolute value of a causal difference ($\Delta^C$) between the noisy sample ($I_t^P$) of the present instant (t) and the causal filtered sample ($P_{t-1}^C$) of the preceding instant (t−1), and tables for determining a causal discontinuity factor ($\alpha_t^C$) as a decreasing function ($F^C$) of the causal difference ($\Delta^C$) normalized by a factor ($S_t^C$) depending on the variance of the noise ($\alpha_B$), a table for determining a factor ($K_t^C$), referred to as a causal gain factor of the present instant (t), equal to the quotient of the causal gain factor ($K_{t-1}^C$) of the preceding instant (t−1) and the sum of said causal gain factor ($K_{t-1}^C$) of the preceding instant and the causal discontinuity coefficient ($\alpha_t^C$), and adders and a multiplier for determining the sum of the filtered causal sample ($P_{t-1}^C$) of the preceding instant (t−1) and the product of said causal gain factor ($K_t^C$) and a difference between the noisy present sample ($I_t^P$) and the causal filtered sample ($P_{t-1}^C$) of the preceding instant, thus producing the value of the filtered causal sample ($P_t^C$).

4. A device for observation of a medical image forming a part of a sequence of medical/images, each image being in the form of a matrix of pixels, comprising:

a system for supplying data of a sequence of images, each in the form of a two-dimensional matrix of pixels having digitized intensity values, an image display system, and an image processing system having access to the data of the sequence of images and to the display system, said image processing system for supplying a noisy digitized intensity ($I_t^P$), referred to as a noisy present sample, of a pixel ($A_t(x,y)$) having a given location (x,y) in an image ($J_t^P$) at said present instant (t), and an anti-causal noisy intensity ($I_{t+1}^A$) of the pixel which is later than the present pixel, referred to as an anti-causal sample, of the same location (x,y) in the matrix of the later image, and including a device for temporal filtering of noise in the images, comprising:

a first sub-assembly, which is referred to as a causal sub-assembly, whose input receives the present noisy sample ($I_t^P$) and comprises linear filtering means with weights for evaluation and for delivering on one output a first filtered value, referred to as a causal filtered sample ($P_t^C$), of the present sample ($I_t^P$), a filtered sample ($P_{t-1}^C$) of the preceding instant on another output, and a causal gain factor ($K_t^C$) equal to the inverse of the sum of the weights of this linear filtering on another output and, a second sub-assembly, referred to as an anti-causal sub-assembly, an input of which receives the causal filtered sample of the preceding instant ($P_{t-1}^C$), a further input of which receives the present causal filtered sample ($P_t^C$), and another input of which receives the anti-causal noisy sample ($I_{t+1}^A$), and comprises linear filtering means with weights for evaluating an anti-causal integration relation with the causal gain factor ($K_t^C$), and for delivering on its output a second value which is referred to as a filtered anti-causal sample ($P_t^A$) and is the filtered sample of the noisy present sample ($I_t^P$).

5. A method for temporally filtering noise in a present image ($J_t^P$) forming part of a temporal sequence of images, each image of the temporal sequence being a two-dimensional matrix of pixels, the values of each pixel at a given location (x, y) in the temporal sequence forming a temporal sequence of samples having digitized intensities comprising noise, said method comprising:

determining a present causal-filtered sample ($P_t^C$), by a temporal-causal-linear filtering defined by causal-gain factors ($K_t^C$), said causal-gain factors evaluated as the inverse of the sum of weights ($b_j^C$) associated with the temporal-causal-linear filtering, determining an anti-causal continuity coefficient ($\alpha_t^A$) associated with an anti-causal noisy-sample ($I_{t+1}^A$), which is later in the temporal sequence than a present noisy-sample ($I_t^P$), by evaluating a probability of intensity continuity between said anti-causal noisy-sample ($I_{t+1}^A$) and a preceding causal-filtered sample ($P_t^C$, $P_{t-1}^C$), determining a present anti-causal filtered sample ($P_t^A$), which is the temporal filter of said present noisy-sample ($I_t^P$), by evaluating an anti-causal linear combination of said present causal-filtered sample ($P_t^C$) and of said anti-causal noisy-sample ($I_{t+1}^A$) with weights calculated, respectively, as a function of the causal-gain factor ($K_t^C$) and of said anti-causal continuity coefficient ($\alpha_t^A$) associated with said anti-causal noisy-sample ($I_{t+1}^A$).

6. The method as claimed in claim 5 wherein, in said anti-causal linear combination, the weight assigned to said anti-causal noisy-sample ($I_{t+1}^A$) is equal to an anti-causal gain-factor ($K_t^A$), and the weight assigned to said causal-filtered sample ($P_t^C$) is equal to at least 1 minus said anti-causal gain-factor, and wherein said anti-causal gain-factor is the ratio of said anti-causal continuity coefficient ($\alpha_t^A$) and the sum of the inverse of said causal gain-factor ($K_t^C$) and said anti-causal continuity coefficient ($\alpha_t^A$).

7. The method as claimed in claim 6, wherein evaluating said anti-causal linear combination comprises evaluating an anti-causal integration relation, which is a non-recursive relation comprising the sum of said present causal-filtered sample ($P_t^C$) and the product of said anti-causal gain-factor ($K_t^A$) by a difference between said anti-causal noisy-sample ($I_{t+1}^A$) and said present causal-filtered sample ($P_t^C$).

8. The method as claimed in claim 7, wherein said anti-causal gain-factor ($K_t^A$) is the ratio of said causal gain-factor ($K_t^C$) and the sum of said causal gain-factor ($K_t^C$) and the inverse of said anti-causal continuity coefficient ($\alpha_t^A$).

9. The method as claimed in claim 8, wherein evaluating said anti-causal integration relation comprises:
determining an anti-causal difference ($\Delta^{A1}$, $\Delta^{A2}$) as the absolute value of the difference between said anti-causal noisy-sample ($I_{t+1}^A$) and either (i) said present causal-filtered sample ($P_t^C$), or (ii) a causal-filtered sample preceding in temporal sequence ($P_{t-1}^C$) the present causal-filtered sample, and
determining said anti-causal continuity coefficient ($\alpha_t^A$) as an anti-causal decreasing function ($F^A$) of said anti-causal difference ($\Delta^{A1}$, $\Delta^{A2}$).

10. The method as claimed in claim 9, wherein said anti-causal decreasing function ($F^A$), which is used in determining said anti-causal continuity coefficient ($\alpha_t^A$), is a function whose argument ($z^A$) is said anti-causal difference ($\Delta^{A1}$, $\Delta^{A2}$) normalized by a factor ($S_t^C$) comprising the square root of the sum of the squares of the differences of the samples of the temporal sequence of samples from the mean value of the samples of the temporal sequence of samples.

11. The method as claimed in claim 10, wherein said anti-causal decreasing function ($F^A$) has a maximum value ($F^A_{max}$) which is smaller than or equal to 1 when its argument ($z^A$) is between 0 and 1, and decreases towards a minimum value ($F^A_{min}$) when its argument is larger than 1.

12. The method as claimed in claim 11, wherein the maximum and minimum values of said anti-causal decreasing function ($F^A(Z^A)$) are chosen to smooth noise peaks and residual noise teeth, whereby a chosen filtering power is achieved.

13. The method as claimed in claim 7, wherein said temporal-causal-linear filtering comprises:
determining said present causal-filtered sample ($P_t^C$) by evaluating a causal linear combination of said present noisy-sample ($I_t^P$), being weighted by the factor 1, and preceding causal noisy-samples in the temporal sequence of samples ($I_j^C$), each sample being weighted by a causal-probability weight ($b_j^C$) which represents the probability of intensity continuity between each said preceding causal noisy-sample and said present noisy-sample.

14. The method as claimed in claim 6, wherein said temporal-causal-linear filtering comprises:
determining said present causal-filtered sample ($P_t^C$) by evaluating a causal linear combination of said present noisy-sample ($I_t^P$), being weighted by the factor 1, and preceding causal noisy-samples in the temporal sequence of samples ($I_j^C$), each sample being weighted by a causal-probability weight ($b_j^C$) which represents the probability of intensity continuity between each said preceding causal noisy-sample and said present noisy-sample.

15. The method as claimed in claim 5, wherein said temporal-causal-linear filtering comprises:
determining said present causal-filtered sample ($P_t^C$) by evaluating a causal linear combination of said present noisy-sample ($I_t^P$), being weighted by the factor 1, and preceding causal noisy-samples in the temporal sequence of samples ($I_j^C$), each sample being weighted by a causal-probability weight ($b_j^C$) which represents the probability of intensity continuity between each said preceding causal noisy-sample and said present noisy-sample.

16. The method as claimed in claim 15,
wherein said causal-probability weight for weighting a given previous causal noisy-sample equals the product of causal-continuity coefficients between the successive preceding causal noisy-samples from said given previous causal noisy-sample until said present noisy-sample,
wherein said causal-continuity coefficient between two successive previous causal noisy-samples represents the probability of intensity continuity between the two previous causal noisy-samples, and
wherein the causal linear combination of said previous causal noisy-samples and said present noisy-sample is normalized by the sum of the causal-probability weights relating to said samples.

17. The method as claimed in claim 16, wherein evaluating said causal linear combination for the determination of said present causal-filtered sample ($P_t^C$) comprises evaluating a causal integration relation, which is a recursive relation comprising the sum of the causal-filtered sample ($P_{t-1}^C$) preceding in the temporal sequence (t−1) and the product of the causal gain-factor ($K_t^C$) by a difference between said present noisy-sample ($I_t^P$) and said preceding causal-filtered sample ($P_{t-1}^C$).

18. The method as claimed in claim 17,
wherein said causal gain-factor ($K_t^C$) is determined by recursively evaluating the ratio of the causal gain-factor ($K_{t-1}^C$) preceding in the temporal sequence (t−1) and the sum of said causal gain-factor ($K_{t-1}^C$) preceding in the temporal sequence and a causal continuity coefficient ($\alpha_t^C$), and
wherein said causal continuity coefficient ($\alpha_t^C$) is said causal-probability weight assigned to the causal sample ($I_{t-1}^C$) preceding the present noisy sample ($I_t^P$) in the temporal sequence,
whereby said causal gain-factor ($K_t^C$) is determined to be the inverse of the sum of the causal-probability weights assigned to the causal noisy-samples of said causal linear combination.

19. The method as claimed in claim 18, wherein evaluating said causal integration relation comprises:

evaluating the absolute value of a causal difference ($\Delta^C$) between said present noisy-sample ($I_t^P$) and said causal-filtered sample ($P_{t-1}^C$) preceding in the temporal sequence (t−1), and evaluating the causal continuity coefficient ($\alpha_t^C$) as a causal decreasing function, said causal function ($F^C$) being a decreasing function whose argument ($z^C$) is said absolute value of said causal difference ($\Delta^C$) normalized by a factor ($S_t^C$) comprising the square root of the sum of the squares of the differences of the samples of the temporal sequence of samples from the mean value of the samples of the temporal sequence of samples.

20. The method as claimed in claim 19, wherein said causal decreasing function ($F^C$) has a constant maximum value smaller than or equal to 1 when its argument ($z^C$) is between 0 and 1, and decreases to a minimum value equal to or larger than zero when its argument is larger than 1, and wherein the maximum ($F^C_{max}$) and minimum ($F^C_{min}$) values of said causal decreasing function ($F^C$) are chosen to smooth the noise peaks and to smooth the noise teeth which follow the discontinuities due to a spatial movement, whereby a chosen filtering power is achieved.

* * * * *